(12) United States Patent
Nakama

(10) Patent No.: US 6,256,436 B1
(45) Date of Patent: Jul. 3, 2001

(54) OPTICAL WAVELENGTH DEMULTIPLEXER

(75) Inventor: Kenichi Nakama, Osaka (JP)

(73) Assignee: Nippon Sheet Glass Co., Ltd, Osaka (JP)

( * ) Notice: Subject to any disclaimer, the term of this patent is extended or adjusted under 35 U.S.C. 154(b) by 0 days.

(21) Appl. No.: 09/457,236

(22) Filed: Dec. 8, 1999

(30) Foreign Application Priority Data

Dec. 9, 1998 (JP) .................................................. 10-349909

(51) Int. Cl.[7] .............................. G02B 6/34; H04J 14/02
(52) U.S. Cl. ................................. 385/37; 385/31; 385/33; 385/88; 385/89; 385/24; 359/127; 359/130
(58) Field of Search .................. 385/16, 17, 31, 385/33, 38, 49, 37, 88, 89, 14, 24; 359/124, 127, 130, 115

(56) References Cited

U.S. PATENT DOCUMENTS

| 4,652,080 | * | 3/1987 | Carter et al. ........................ 385/37 X |
| 5,325,224 | | 6/1994 | Lang et al. ............................ 359/139 |
| 5,412,506 | * | 5/1995 | Feldblum et al. .................. 385/37 X |
| 5,671,304 | | 9/1997 | Duguay .................................. 385/17 |
| 5,793,912 | * | 8/1998 | Boord et al. ............................ 385/37 |
| 6,011,884 | * | 1/2000 | Dueck et al. ............................ 385/24 |
| 6,088,496 | * | 7/2000 | Asghari .................................. 385/37 |
| 6,137,933 | * | 10/2000 | Hunter et al. ........................... 385/37 |
| 6,181,853 | * | 1/2001 | Wade ...................................... 385/37 |

FOREIGN PATENT DOCUMENTS

| 3432743 | | 3/1986 | (DE) ................................... 385/37 X |
| 2680012 | | 2/1993 | (FR) ................................... 385/37 X |
| 2202404 | * | 9/1988 | (GB) .................................. 385/37 X |
| 92/11517 | | 7/1992 | (WO) ................................. 385/37 X |

* cited by examiner

Primary Examiner—Brian Healy
(74) Attorney, Agent, or Firm—Schwegman, Lundberg, Woessner & Kluth, P.A.

(57) ABSTRACT

An optical wavelength demultiplexer has at least two optical fibers and a two-dimensional array of photodetectors arranged in as many rows as the number of optical fibers and as many columns as the number of demultiplex channels. Any one of said optical fibers and a central line of one of said rows which corresponds to said any one of the optical fibers are spaced equal distances from the optical axis of a focusing element such as a collimator lens or a concave diffraction grating. A light ray emitted from any one of the optical fibers is demultiplexed by a planar or concave diffraction grating into light rays, which are applied to a corresponding row of photodetectors to produce output signals in the respective demultiplex channels. The planar diffraction grating and the collimator lens, or the concave diffraction grating is shared by the at least two optical fibers which provide input capabilities.

7 Claims, 2 Drawing Sheets

OPTICAL WAVELENGTH DEMULTIPLEXER

BACKGROUND OF THE INVENTION

1. Field of the Invention

The present invention relates to an optical wavelength demultiplexer mainly for use in wavelength-division-multiplexed optical communications.

2. Description of the Related Art

Heretofore, optical wavelength demultiplexers mainly for use in the art of wavelength-division-multiplexed optical communications comprise a single optical fiber, a collimator lens, a diffraction grating, and a one-dimensional array of photodetectors. In the optical wavelength demultiplexers, the optical fiber is positioned at the focal point of the collimator lens. Light emitted from the optical fiber is converted by the collimator lens into parallel light that is applied to the diffraction grating which is Littrow-mounted. The diffraction grating demultiplexes the light with its chromatic dispersion capability and applies the demultiplexed light rays to the collimator lens, which focuses the light rays on the photodetectors in respective channels.

Another type of optical wavelength demultiplexer comprises a concave diffraction grating, a single optical fiber disposed at the focal point of the concave diffraction grating, and a one-dimensional array of photodetectors. Light emitted from the optical fiber is reflected and demultiplexed by the concave diffraction grating into light rays that are focused on the photodetectors in respective channels.

If the number of demultiplex channels is to increase, then the photodetector array will require an increased number of photodetectors. Since the photodetector array will have an increased width, it will be difficult to design aberrations of the collimator lens.

One optical wavelength demultiplexer provides a single input capability. If an optical wavelength demultiplexer system with two or more input capabilities is needed, then it is necessary to provide as many optical wavelength demultiplexers as the required number of input capabilities. Since each of the optical wavelength demultiplexers has the diffraction grating and the collimator lens, or the concave diffraction grating, which is expensive, the overall optical wavelength demultiplexer system is highly expensive.

SUMMARY OF THE INVENTION

It is therefore an object of the present invention to provide an optical wavelength demultiplexer which is small in size and low in cost and which has a single diffraction grating and a single collimator lens or a single concave diffraction grating that is shared by two or more input capabilities for achieving a required optical wavelength demultiplexing function.

According to an aspect of the present invention, there is provided an optical wavelength demultiplexer comprising at least two optical fibers, a two-dimensional array of photodetectors arranged in as many rows as the number of optical fibers and as many columns as the number of demultiplex channels, a collimator lens, and a diffraction grating for demultiplexing a light ray emitted from each of the optical fibers into the demultiplex channels, any one of the optical fibers and a central line of one of the rows which corresponds to the any one of the optical fibers being spaced equal distances from an optical axis of the collimator lens.

The optical fibers and the two-dimensional array of photodetectors may be disposed on a focal plane of the collimator lens, and axially symmetric with respect to the optical axis of the collimator lens. Specifically, the optical fibers and the two-dimensional array of photodetectors may be disposed on a front focal plane of the collimator lens, and the diffraction grating may comprise a planar diffraction grating disposed on a back focal plane of the collimator lens.

According to another aspect of the present invention, there is provided an optical wavelength demultiplexer comprising at least two optical fibers, a two-dimensional array of photodetectors arranged in as many rows as the number of optical fibers and as many columns as the number of demultiplex channels, and a concave diffraction grating for demultiplexing a light ray emitted from each of the optical fibers into the demultiplex channels, any one of the optical fibers and a central line of one of the rows which corresponds to the any one of the optical fibers being spaced equal distances from an optical axis of the concave diffraction grating.

The optical fibers and the two-dimensional array of photodetectors may be disposed on a focal plane of the concave diffraction grating, and axially symmetric with respect to an optical axis of the concave diffraction grating.

According to still another aspect of the present invention, there is provided an optical wavelength demultiplexer comprising at least two optical fibers, a two-dimensional array of photodetectors arranged in as many rows as the number of optical fibers and as many columns as the number of demultiplex channels, and a focusing and demultiplexing element for focusing and demultiplexing a light ray emitted from each of the optical fibers into the demultiplex channels, any one of the optical fibers and a central line of one of the rows which corresponds to the any one of the optical fibers being conjugate to each other with respect to the focusing and demultiplexing element.

Any one of the optical fibers and a central line of one of the rows which corresponds to the any one of the optical fibers may be spaced equal distances from an optical axis of the focusing and demultiplexing element.

A light ray emitted from any one of the optical fibers is demultiplexed by the planar or concave diffraction grating into light rays, which are applied to a corresponding row of photodetectors to produce output signals in the respective demultiplex channels. The planar diffraction grating and the collimator lens, or the concave diffraction grating is shared by the at least two optical fibers which provide input capabilities. The optical wavelength demultiplexer may be relatively small in size and low in cost.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
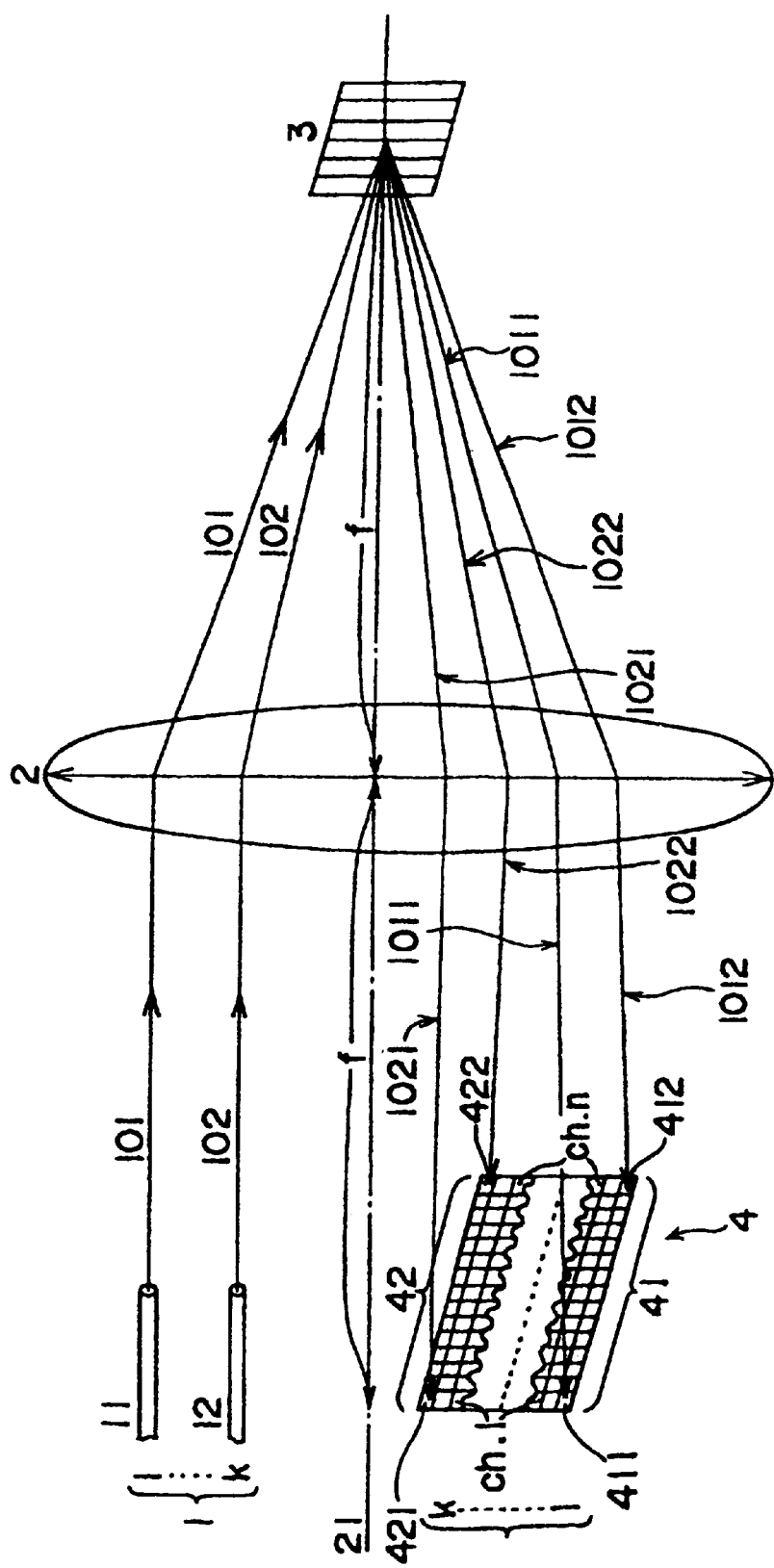
FIG. 1 is a schematic diagram of an optical wavelength demultiplexer having a collimator lens and a planar diffraction grating according to a first embodiment of the present invention.

Like or corresponding parts are denoted by like or corresponding reference characters throughout the views.

As shown in FIG. 1, an optical wavelength demultiplexer according to a first embodiment of the present invention comprises a plurality of k input optical fibers 1 and a planar two-dimensional array 4 of photodetectors arranged in k rows, i.e., in as many rows as the number of input optical fibers 1 and n columns corresponding respectively to n demultiplex channels. The input optical fibers 1 and the planar two-dimensional array 4 of photodetectors are positioned on a front focal plane of a collimator lens 2. The optical wavelength demultiplexer also has a planar diffraction grating 3 positioned on a back focal plane of the collimator lens 2. The k input optical fibers 1 include a first optical fiber 11 and a kth optical fiber 12, and the planar two-dimensional array 4 of photodetectors includes a row 41 of photodetectors which corresponds to the first optical fiber 11 and a row 42 of photodetectors which corresponds to the kth optical fiber 12. The first optical fiber 11 and the row 41 of photodetectors, and the kth optical fiber 12 and the row 42 of photodetectors are axially symmetric with respect to an optical axis 21 of the collimator lens 2. In FIG. 1, the planar two-dimensional array 4 of photodetectors is fragmentarily shown with its central region omitted from illustration for the sake of brevity.

The planar diffraction grating 3 positioned on the back focal plane of the collimator lens 2 has its gratings oriented parallel to the 1st through kth optical fibers 11, 12.

An input light ray 101 from the first optical fiber 11 is refracted by the collimator lens 2, and demultiplexed into light rays in the respective n channels by the planar diffraction grating 3. Of the demultiplexed light rays, a signal light ray 1011 in the channel 1 and a signal light ray 1012 in the channel n are refracted again by the collimator lens 2. Of the row 41 of photodetectors which is disposed in a position conjugate to the first optical fiber 11 with respect to the collimator lens 2 and the planar diffraction grating 3 and corresponds to the first optical fiber 11, a photodetector 411 detects the signal light ray 1011 in the channel 1, and a photodetector 412 detects the signal light ray 1012 in the channel n, and they produce respective output signals in the channels 1, n.

Similarly, an input light ray 102 from the kth optical fiber 11 is refracted by the collimator lens 2, and demultiplexed into light rays in the respective n channels by the planar diffraction grating 3. Of the demultiplexed light rays, a signal light ray 1021 in the channel 1 and a signal light ray 1022 in the channel n are refracted again by the collimator lens 2. Of the row 42 of photodetectors which is disposed in a position conjugate to the kth optical fiber 12 with respect to the collimator lens 2 and the planar diffraction grating 3 and corresponds to the kth optical fiber 12, a photodetector 421 detects the signal light ray 1021 in the channel 1, and a photodetector 422 detects the signal light ray 1022 in the channel n, and they produce respective output signals in the channels 1, n.

The collimator lens 2 and the planar diffraction grating 3 are shared by the k input optical fibers 1 and can produce output signals in the n channels which correspond respectively to the k input optical fibers 1.

In the first embodiment shown in FIG. 1, the input optical fibers 1 and the planar two-dimensional array 4 of photodetectors are positioned on the front focal plane of the collimator lens 2. However, the input optical fibers 1 and the planar two-dimensional array 4 of photodetectors may be conjugate to each other with respect to the collimator lens 2 and the planar diffraction grating 3 such that the demultiplexed light rays in the channels will be concentrated on the planar two-dimensional array 4 of photodetectors. Furthermore, while the planar diffraction grating 3 is positioned on the back focal plane of the collimator lens 2 in the first embodiment shown in FIG. 1, since the light rays refracted by the collimator lens 2 are substantially parallel light rays, the planar diffraction grating 3 operates similarly in a position other than the back focal plane of the collimator lens 2 and hence may be positioned anywhere behind the collimator lens 2.

In the first embodiment, the collimator lens 2 and the planar diffraction grating 3 perform a refracting (focusing) and demultiplexing function. However, an optical element which has such a refracting (focusing) and demultiplexing function operates in the same manner as the collimator lens 2 and the planar diffraction grating 3. For example, if a concave diffraction grating or a holographic element which has a focusing and demultiplexing function is positioned in place of the collimator lens 2 and the planar diffraction grating 3 and the optical fibers 1 and the planar two-dimensional array 4 of photodetectors are positioned as shown in FIG. 1, then such a combination will operate in the same manner as the illustrated optical wavelength demultiplexer.

An optical wavelength demultiplexer which employs a concave diffraction grating according to a second embodiment of the present invention will be described below with reference to FIG. 2.

Figure 2:
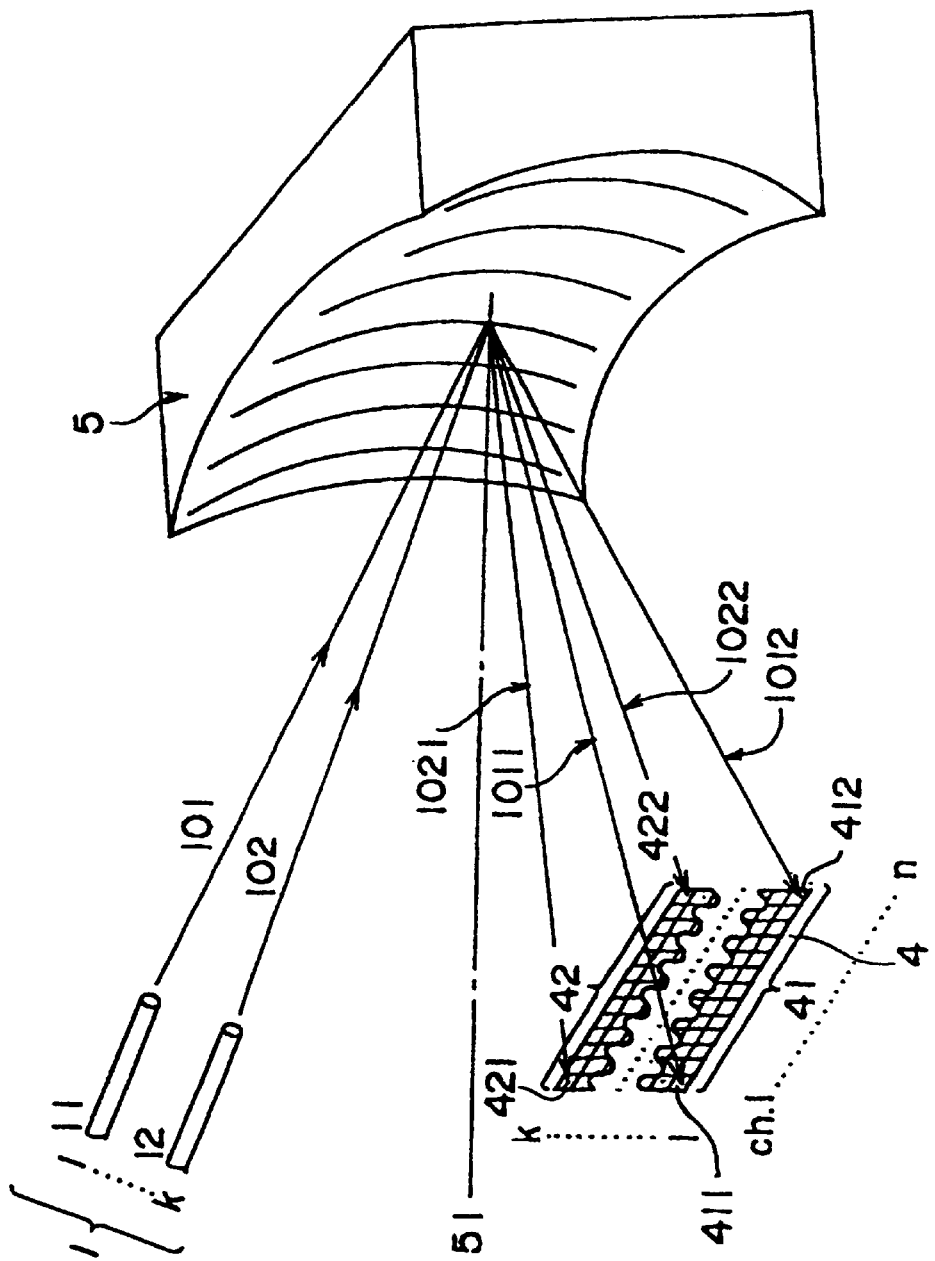
FIG. 2 is a schematic diagram of an optical wavelength demultiplexer having a concave diffraction grating according to a second embodiment of the present invention.

As shown in FIG. 2, the optical wavelength demultiplexer according to the second embodiment of the present invention comprises a plurality of k input optical fibers 1 and a planar two-dimensional array 4 of photodetectors arranged in k rows, i.e., in as many rows as the number of input optical fibers 1 and n columns corresponding respectively to n demultiplex channels. The input optical fibers 1 and the planar two-dimensional array 4 of photodetectors are positioned on the focal plane of a concave diffraction grating 5 which has its gratings oriented parallel to the k input optical fibers. The input optical fibers 1 and the planar two-dimensional array 4 of photodetectors are spaced equal distances from an optical axis 51 of the concave diffraction grating 5. The k input optical fibers 1 include a first optical fiber 11 and a kth optical fiber 12, and the planar two-dimensional array 4 of photodetectors includes a row 41 of photodetectors which corresponds to the first optical fiber 11 and a row 42 of photodetectors which corresponds to the kth optical fiber 12. The first optical fiber 11 and the row 41 of photodetectors, and the kth optical fiber 12 and the row 42 of photodetectors are axially symmetric with respect to an optical axis 51 of the collimator lens 2. In FIG. 2, the planar two-dimensional array 4 of photodetectors is fragmentarily shown with its central region omitted from illustration for the sake of brevity.

An input light ray 101 from the first optical fiber 11 is demultiplexed and reflected into light rays in the respective n channels by the concave diffraction grating 5. The demultiplexed light rays include a signal light ray 1011 in the channel 1 and a signal light ray 1012 in the channel n. Of the row 41 of photodetectors which is disposed in a position conjugate to the first optical fiber 11 with respect to the concave diffraction grating 5 and corresponds to the first optical fiber 11, a photodetector 411 detects the signal light ray 1011 in the channel 1, and a photodetector 412 detects the signal light ray 1012 in the channel n, and they produce respective output signals in the channels 1, n.

Similarly, an input light ray 102 from the kth optical fiber 12 is demultiplexed and reflected into light rays in the respective n channels by the concave diffraction grating 5. The demultiplexed light rays include a signal light ray 1021 in the channel 1 and a signal light ray 1022 in the channel n. Of the row 41 of photodetectors which is disposed in a position conjugate to the first optical fiber 11 with respect to the concave diffraction grating 5 and corresponds to the first optical fiber 11, a photodetector 421 detects the signal light ray 1021 in the channel 1, and a photodetector 422 detects the signal light ray 1022 in the channel n, and they produce respective output signals in the channels 1, n.

The axial direction of the optical fibers 1 and the direction normal to the planar two-dimensional array 4 of photodetectors do not extend parallel to the optical axis 51 of the concave diffraction grating 5. However, the axial direction of the optical fibers 1 and the direction normal to the planar two-dimensional array 4 of photodetectors may be parallel to the optical axis 51 if such an orientation does not impair the condensing capability of the concave diffraction grating 5.

Although certain preferred embodiments of the present invention have been shown and described in detail, it should be understood that various changes and modifications may be made therein without departing from the scope of the appended claims.

What is claimed is:

1. An optical wavelength demultiplexer comprising:
   at least two optical fibers;
   a two-dimensional array of photodetectors arranged in as many rows as the number of optical fibers and as many columns as the number of demultiplex channels;
   a collimator lens; and
   a diffraction grating for demultiplexing a light ray emitted from each of said optical fibers into said demultiplex channels;
   any one of said optical fibers and a central line of one of said rows which corresponds to said any one of the optical fibers being spaced equal distances from an optical axis of said collimator lens.

2. An optical wavelength demultiplexer according to claim 1, wherein said optical fibers and said twodimensional array of photodetectors are disposed on a focal plane of said collimator lens, and axially symmetric with respect to the optical axis of said collimator lens.

3. An optical wavelength demultiplexer according to claim 2, wherein said optical fibers and said two-dimensional array of photodetectors are disposed on a front focal plane of said collimator lens, and said diffraction grating comprises a planar diffraction grating disposed on a back focal plane of said collimator lens.

4. An optical wavelength demultiplexer comprising:
   at least two optical fibers;
   a two-dimensional array of photodetectors arranged in as many rows as the number of optical fibers and as many columns as the number of demultiplex channels; and
   a concave diffraction grating for demultiplexing a light ray emitted from each of said optical fibers into said demultiplex channels;
   any one of said optical fibers and a central line of one of said rows which corresponds to said any one of the optical fibers being spaced equal distances from an optical axis of said concave diffraction grating.

5. An optical wavelength demultiplexer according to claim 4, wherein said optical fibers and said two-dimensional array of photodetectors are disposed on a focal plane of said concave diffraction grating, and axially symmetric with respect to an optical axis of said concave diffraction grating.

6. An optical wavelength demultiplexer comprising:
   at least two optical fibers;
   a two-dimensional array of photodetectors arranged in as many rows as the number of optical fibers and as many columns as the number of demultiplex channels; and
   a focusing and demultiplexing element for focusing and demultiplexing a light ray emitted from each of said optical fibers into said demultiplex channels;
   any one of said optical fibers and a central line of one of said rows which corresponds to said any one of the optical fibers being conjugate to each other with respect to said focusing and demultiplexing element.

7. An optical wavelength demultiplexer according to claim 6, wherein any one of said optical fibers and a central line of one of said rows which corresponds to said any one of the optical fibers are spaced equal distances from an optical axis of said focusing and demultiplexing element.

\* \* \* \* \*